United States Patent
Zempel et al.

(10) Patent No.: US 11,828,325 B2
(45) Date of Patent: Nov. 28, 2023

(54) LATTICE FOR STRUCTURES

(71) Applicant: The Aerospace Corporation, El Segundo, CA (US)

(72) Inventors: Christian Zempel, El Segundo, CA (US); Donald Wayne Denham, Redondo Beach, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 691 days.

(21) Appl. No.: 16/709,917

(22) Filed: Dec. 10, 2019

(65) Prior Publication Data

US 2021/0172466 A1 Jun. 10, 2021

(51) Int. Cl.
  *F16B 9/00* (2006.01)
  *B64G 99/00* (2009.01)

(52) U.S. Cl.
  CPC ............... *F16B 9/09* (2018.08); *B64G 99/00* (2022.08); *F16B 2200/83* (2023.08); *Y10T 403/342* (2015.01)

(58) Field of Classification Search
  CPC .... F16B 9/09; F16B 21/09; F16B 2001/0035; Y10S 403/01; Y10T 403/34; Y10T 403/341; Y10T 403/342; Y10T 403/347; Y10T 403/7018; B64C 1/08; B64C 1/64; B64C 2001/0092
  USPC .................................................. 403/DIG. 1
  See application file for complete search history.

(56) References Cited

U.S. PATENT DOCUMENTS

| | | | |
|---|---|---|---|
| 4,314,636 A | 2/1982 | Slysh | |
| 4,524,552 A | 6/1985 | Hujsak | |
| 4,645,373 A * | 2/1987 | Purdy | F16B 21/00 403/381 |
| 4,775,258 A * | 10/1988 | Lange | E04H 12/10 403/171 |
| RE33,438 E * | 11/1990 | Stewart | B64G 99/00 24/654 |
| 5,007,762 A * | 4/1991 | Duran | F16D 1/112 403/171 |
| 7,374,134 B2 | 5/2008 | Collyer et al. | |
| 9,127,450 B2 | 9/2015 | Rivers | |
| 11,497,313 B2 * | 11/2022 | Harve | A47B 96/20 |
| 2007/0099469 A1 * | 5/2007 | Sorensen | A45F 5/02 439/289 |
| 2014/0072363 A1 * | 3/2014 | Boze | F16B 7/185 403/171 |
| 2019/0385774 A1 * | 12/2019 | Denham | H01F 7/20 |

FOREIGN PATENT DOCUMENTS

WO WO-2006089539 A1 * 8/2006 ............. F16B 12/20

* cited by examiner

*Primary Examiner* — Josh Skroupa
*Assistant Examiner* — Zachary A Hall
(74) *Attorney, Agent, or Firm* — LeonardPatel PC

(57) ABSTRACT

A lattice system for structures includes a lattice joint housing and a plurality of structural joints. Each of the plurality of structural joints have a side entry slot for insertion of keyed features on a mating lattice member. Each of the plurality of structural joints are configured to facilitate rotation of the mating lattice member, semi-permanently holding the mating lattice member in place with an electro-permanent magnetic (EPM) retaining device.

26 Claims, 8 Drawing Sheets

Front View
(a)

Fig. 4B

Side View
(b)

LATTICE FOR STRUCTURES

FIELD

The present invention relates to space structures, and more particularly, to lattices maximizing strength-to-mass ratio, facilitating large yet low-mass structures in space.

BACKGROUND

The current state-of-the-art for the construction of large space structures rely on manufacturing methods that result in the permanent jointing of truss-joint connections. Once the mission is complete, the large structure must be de-orbited or abandoned in a graveyard orbit. A semi-permanent structure could be reconfigured to meet the requirements for a new mission and eliminate the need to launch new material for a new large space structure.

SUMMARY

Certain embodiments of the present invention may provide solutions to the problems and needs in the art that have not yet been fully identified, appreciated, or solved by current space structure systems. For example, some embodiments pertain to lattices that maximize strength-to-mass ratio, facilitating large yet low-mass structures in space.

In an embodiment, a system includes a lattice joint housing and a plurality of structural joints. Each of the plurality of structural joints have a side entry slot for insertion of keyed features on a mating lattice member. Each of the plurality of structural joints are configured to facilitate rotation of the mating lattice member, semi-permanently holding the mating lattice member in place with an electro-permanent magnetic (EPM) retaining device.

In another embodiment, a system includes a lattice joint housing and a plurality of structural joints. Each of the plurality of structural joints have a side entry slot for insertion of keyed features on a mating lattice member. Each of the plurality of structural joints are configured to facilitate rotation of the mating lattice member, semi-permanently holding the mating lattice member in place with an EPM retaining device. The system also includes a wiring harness connecting the embedded EPM with one or more electrical contacts. The one or more electrical contacts provide a current path from an external source, such that a current is routed from the one or more electrical contacts to wiring harness and embedded EPM to activate or deactivate embedded EPM.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Some embodiments pertain to lattices that maximize strength-to-mass ratio, facilitating large yet low-mass structures in space. These lattices give the ability to build larger structures in space (for solar sails, solar farms, etc.) at a drastically reduced cost than available by the current state of the art. The lattices also have the ability to reconfigure the space structure to adapt to changing mission requirements. The lattices include structural joints that are non-permanent in so far that the structural joints can be repurposes for new mission requirements and enable new mission concepts. Because the lattices utilize EPMs that use 40-100 mW per structural joint, the structural joints use approximately 7,000 times less power than current state of the art-welding techniques.

Figure 1:
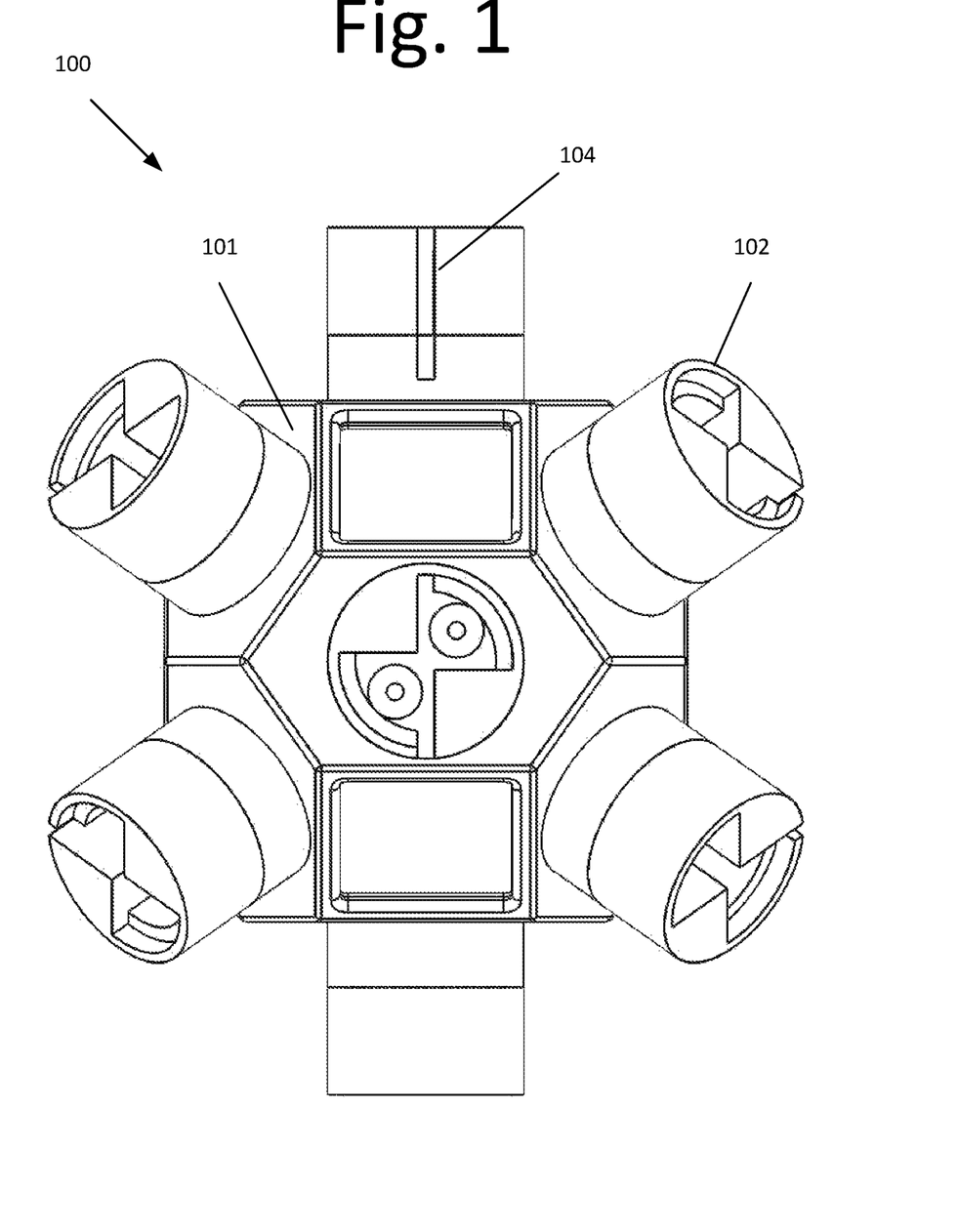
FIG. 1 is a diagram illustrating a lattice for space structures, according to an embodiment of the present invention.
Figure 4A:
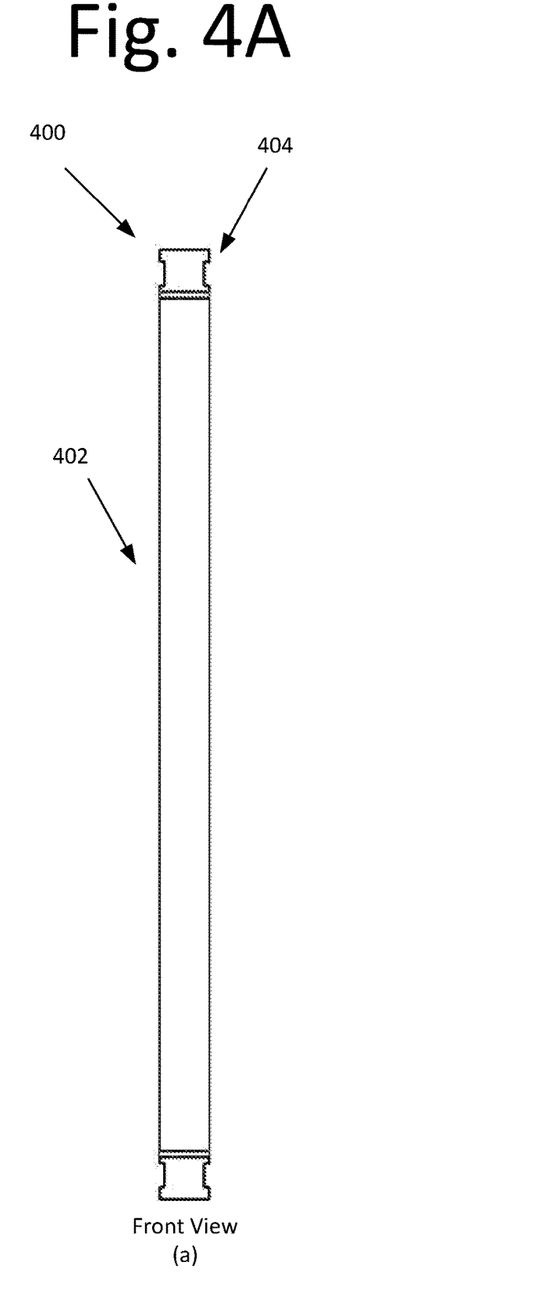
FIGS. 4A and 4B are diagrams illustrating a front view (a) and side view (b) of a structural tube (or structural rod), according to an embodiment of the present invention.
Figure 4B:
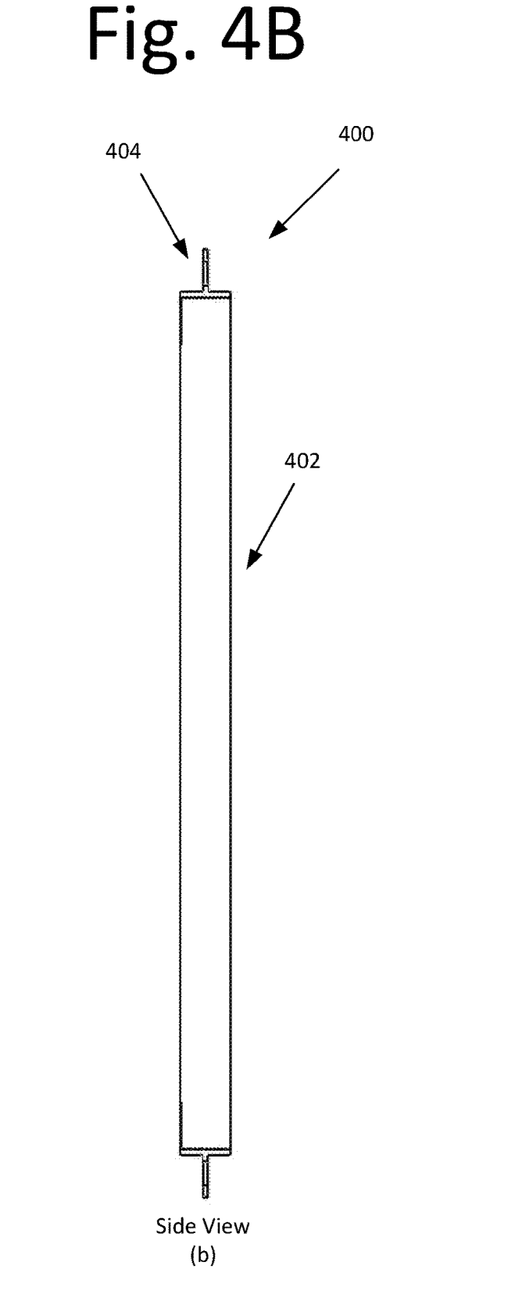

FIG. 1 is a diagram illustrating a lattice joint 100, according to an embodiment of the present invention. In an embodiment, lattice joints 100 include a lattice joint housing 101 and a plurality of structural joints 102. These structural joints 102 are connection points for other structural members of the lattice. Structural joints 102 have a side entry slot 104 for the insertion of keyed features on the mating lattice members. Keyed features may be defined as a two-piece locking system where each part forms a portion of the lock. The keyed features allow the parts to be connect with little or no force. Once the parts are rotated into the locked position, the parts can withstand high tensile or compressive loads. Structural joint 102 in some embodiments allows the mating lattice member (see FIG. 4) to be rotated and semi-permanently held in place with an EPM retaining device (not shown). Further, structural joints 102 are mechanically coupled to lattice joint housing 101 by mechanical fasteners, adhesive or other physical bonding technique.

Figure 2:
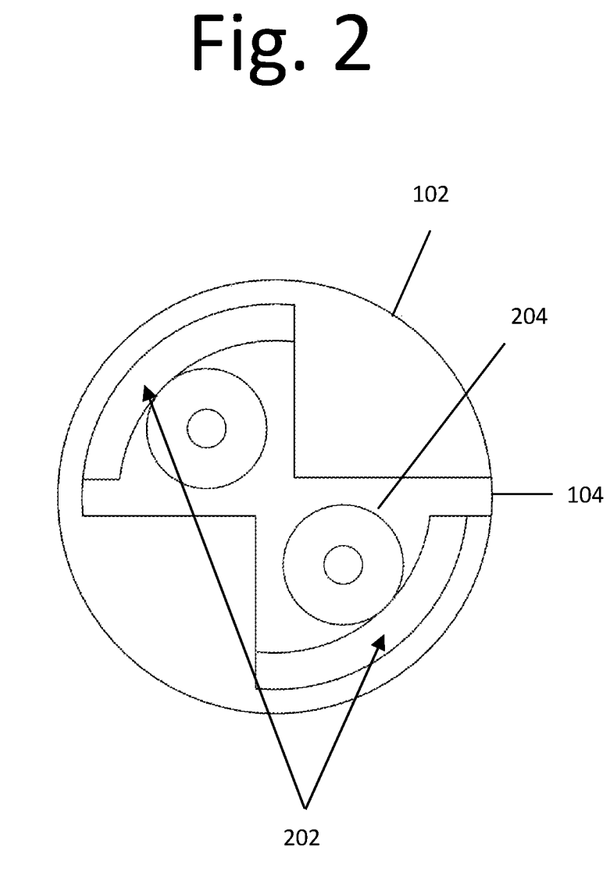
FIG. 2 is a diagram illustrating a top view of a structural joint of lattice, according to an embodiment of the present invention.

FIG. 2 is a diagram illustrating a top view of a structural joint 102 of lattice 100, according to an embodiment of the present invention.

In an embodiment, structural joint 102 is composed of several features. For example, structural joints 102 have a side entry slot 104 for the insertion of the keyed features on the mating lattice members. Structural joints 102 incorporated a keyed type retaining feature 202 that allows a mating member of the lattice to be rotated after being inserted in entry slot 104. The mating member of the lattice may be defined as any structural element or device that has the keyed feature required to mate with structural joint 102. Retaining feature 202 holds the mating member axially in place and reacts the axial loads to lattice joint housing 101. Structural joint 102 contains clearance holes 204 for mechanical fasteners that mechanically couple the structural joint 102 to the lattice joint housing 101.

Figure 3:
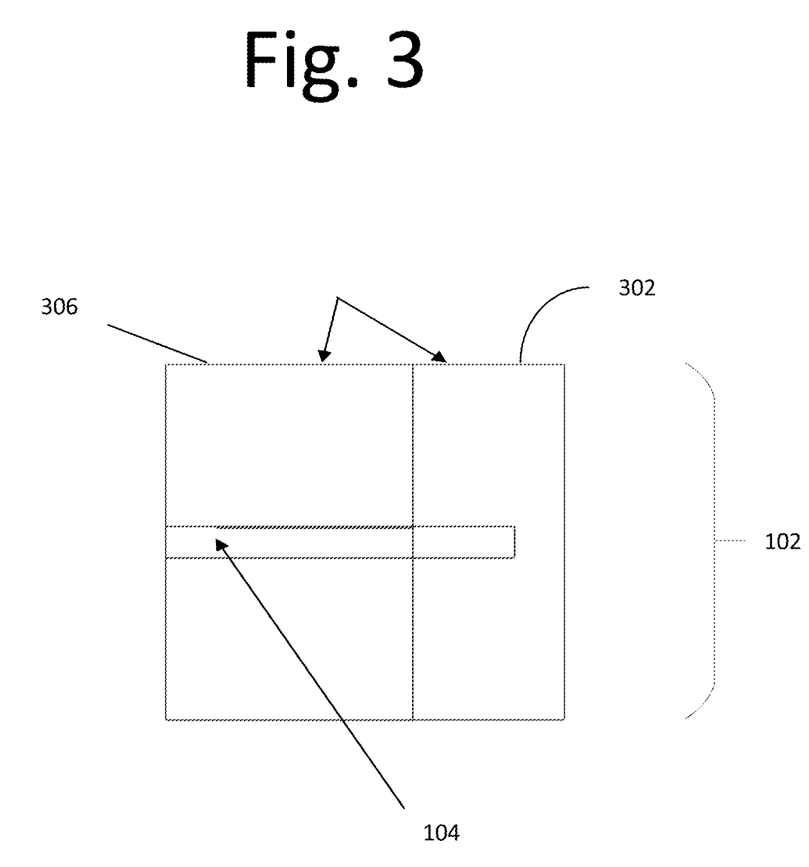
FIG. 3 is a diagram illustrating a side view of a structural joint of lattice, according to an embodiment of the present invention.

FIG. 3 is a diagram illustrating a side view of a structural joint 102 of lattice 100, according to an embodiment of the present invention.

In an embodiment, structural joint 102 is composed of a base plate 302 and lock plate 306. Base plate 302 and lock plate 306 are coupled in a manner that joins plates 302 and 306 in a manner that prevents disassembly commonly referred to as an inseparable assembly. Alignment features on base plate 302 and lock plate 306 align slot 104 features.

FIGS. 4A and 4B are diagrams illustrating a front view (a) and side view (b) of a structural tube (or structural rod) 400, according to an embodiment of the present invention. In an embodiment, structural tube 400 is composed of two inserts 404 and one tube 402. Inserts 404 are bonded to tube 402 with adhesive or another bonding agent.

Figure 5A:
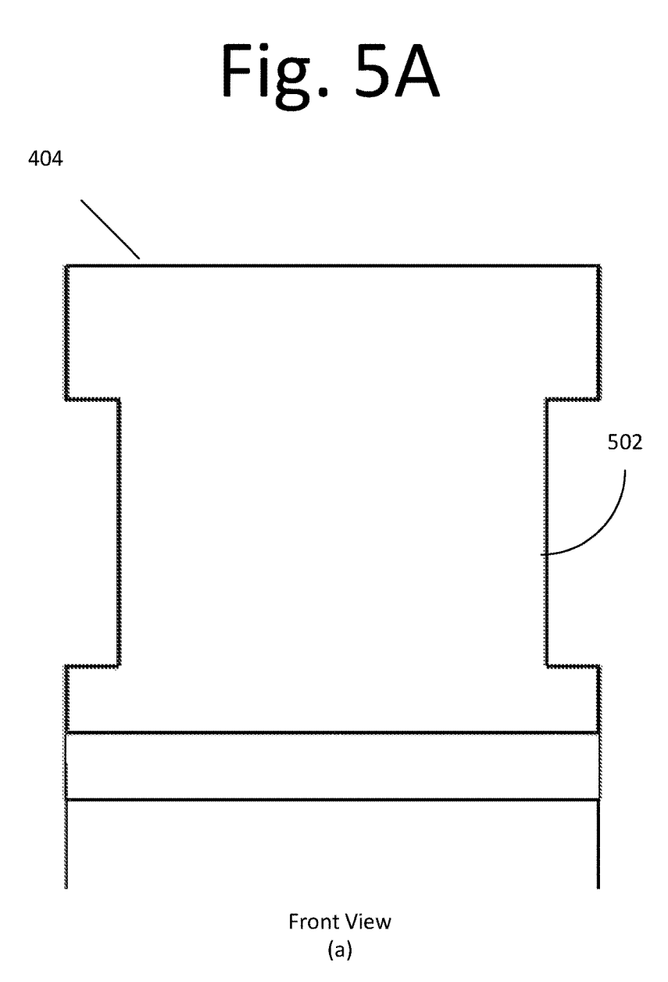
FIGS. 5A and 5B are diagrams illustrating a front view (a) and side view (b) of an insert for the tube of FIGS. 4A and 4B, according to an embodiment of the present invention.
Figure 5B:
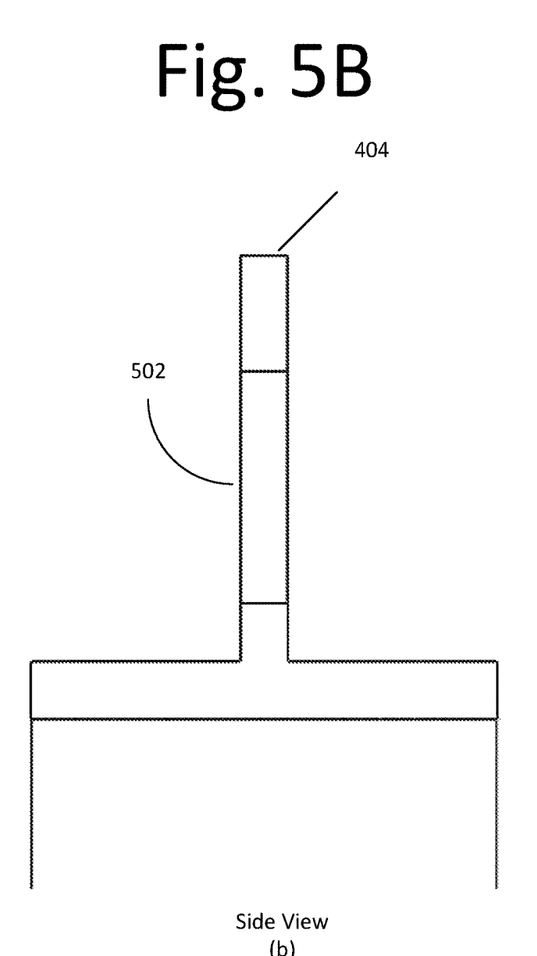

FIGS. 5A and 5B are diagrams illustrating a front view (a) and side view (b) of an insert 404 for tube 402 of FIGS. 4A and 4B, according to an embodiment of the present invention. In an embodiment, insert 404 has key feature 502, which mates with retaining feature 202 of FIG. 2 to axially lock structural tube 400 to structural joint 102.

Figure 6A:
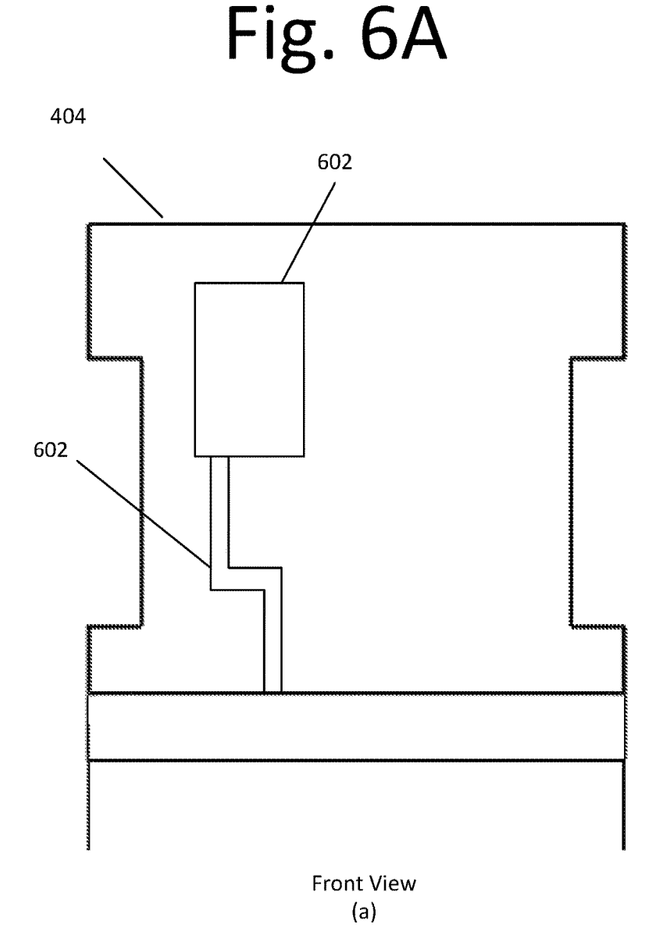
FIGS. 6A and 6B are diagrams illustrating a front view (a) and side view (b) of an insert for tube with an embedded anti-rotation EPM, according to an embodiment of the present invention.
Figure 6B:
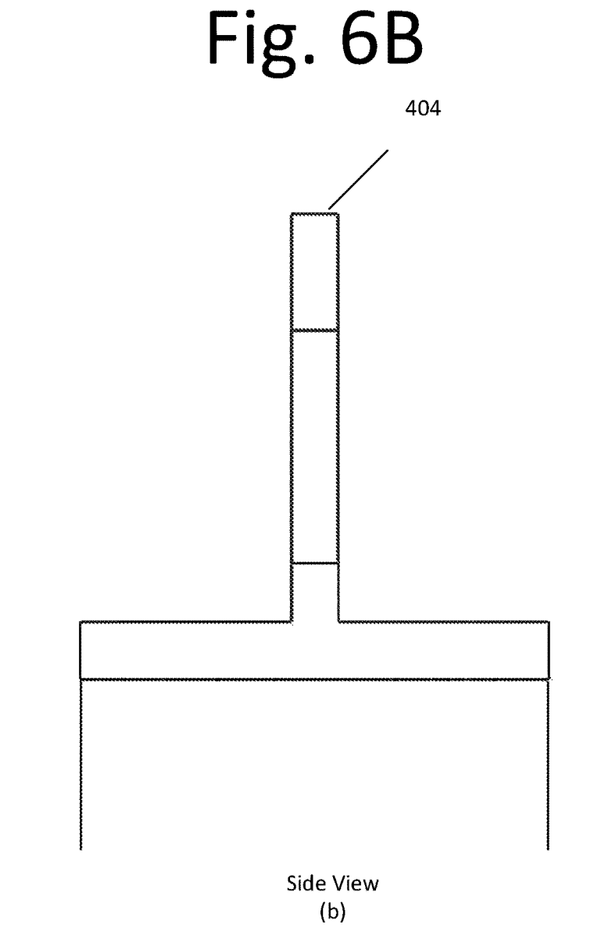

FIGS. 6A and 6B are diagrams illustrating a front view (a) and side view (b) of an insert 404 for tube 402 with an embedded anti-rotation EPM 602, according to an embodiment of the present invention. In an embodiment, insert 404 has an embedded EPM 602 that clamps to ferromagnetic plate 802 (see FIG. 8). A wiring harness 604 connected to embedded EPM 602 provides a current path for activating and deactivating embedded EPM 602. Wiring harness 602 is routed through the base of insert 404 into tube 402, in some embodiments.

Figure 7:
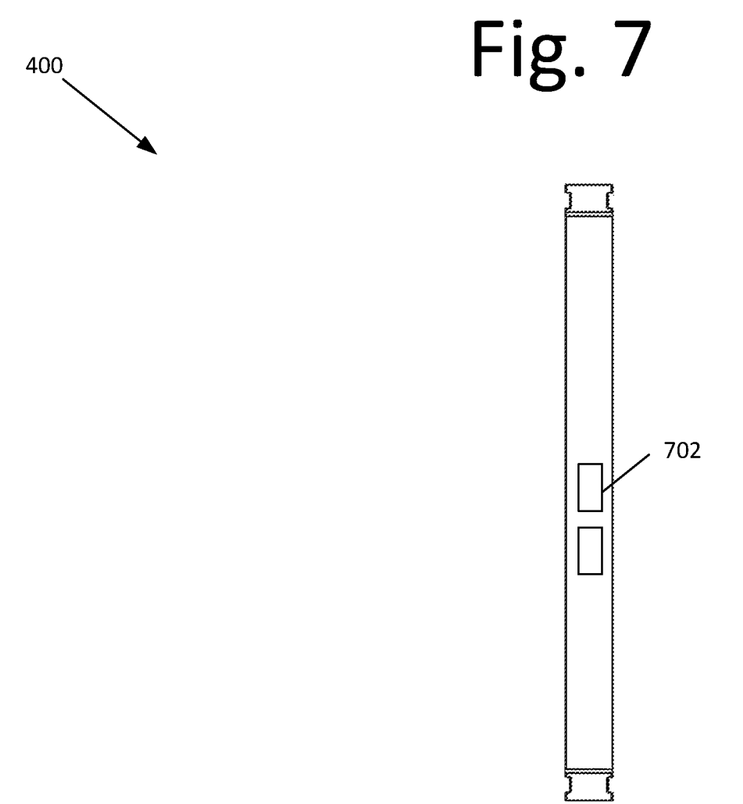
FIG. 7 is a diagram illustrating a front view of a structural tube (or structural rod) with integrated electrical contacts, according to an embodiment of the present invention.

FIG. 7 is a diagram illustrating a front view of a structural tube (or structural rod) 400 with integrated electrical contacts 702, according to an embodiment of the present invention. In an embodiment, electrical contacts 702 are connected to the wiring harness 604 of FIG. 6. Electrical contacts 702 in some embodiments provide a current path from an external source (not shown) through electrical contacts 702. The current may be routed from electrical contacts 702 to wiring harness 604 and embedded EPM 602 to activate or deactivate embedded EPM 602.

Figure 8:
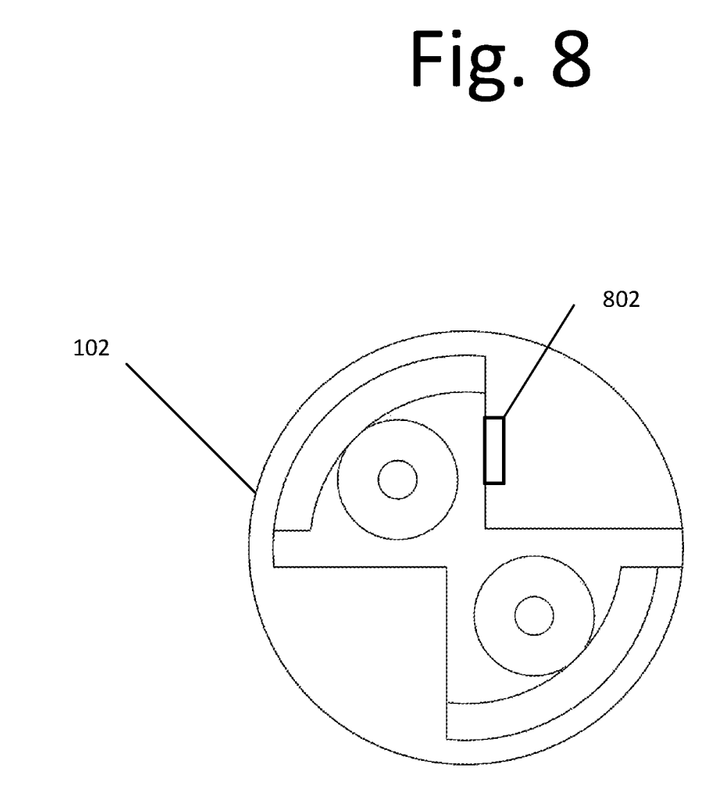
FIG. 8 is a diagram illustrating a top view of a structural joint with an embedded ferromagnetic plate, according to an embodiment of the present invention.

FIG. 8 is a diagram illustrating a top view of a structural joint 102 with an embedded ferromagnetic plate 802, according to an embodiment of the present invention.

In an embodiment, structural joint 102 has an embedded ferromagnetic plate 802 that provides a magnetic flux path for embedded EPM 602 of FIG. 6. The flux path creates a clamping force between magnetic plate 802 and embedded EPM 602 to prevent the rotation of structural tube 400 while embedded EPM 602 is activated. When embedded EPM 602 is deactivated no clamping force is generated and structural tube 400 is free to rotate.

Some embodiments generally pertain to a system that includes a lattice joint housing and a plurality of structural joints. Each of the plurality of structural joints have a side entry slot for insertion of keyed features on a mating lattice member. Each of the plurality of structural joints are configured to facilitate rotation of the mating lattice member, semi-permanently holding the mating lattice member in place with an EPM retaining device. The system also includes a wiring harness connecting the embedded EPM with one or more electrical contacts. The one or more electrical contacts provide a current path from an external source, such that a current is routed from the one or more electrical contacts to wiring harness and embedded EPM to activate or deactivate embedded EPM.

It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A system, comprising:
a lattice joint housing; and
a plurality of structural joints, each of the plurality of structural joints have a side entry slot for insertion of keyed features on a mating lattice member, the keyed features being part of a structural rod, wherein each of the plurality of structural joints comprising a first retaining feature and a second retaining feature, and are configured to rotate the mating lattice member, semi-permanently holding the mating lattice member in place with an electro-permanent magnetic (EPM) retaining device, the EPM retaining device being part of the second retaining feature, the keyed feature has an inner portion and an outer portion, the inner portion being smaller in width than the outer portion, the inner portion being closer in proximity to the structural rod than the outer portion, the keyed feature comprising two opposing parallel sides extending along a longitudinal axis of the mating lattice member, the two opposing parallel sides are formed on both the inner and outer portions, wherein the two opposing parallel sides are inserted within the side entry slot to abut interior surfaces of one of the plurality of structural joints and prevent rotation, a surface of the outer portion of the keyed feature and a surface of the first retaining feature overlap, retaining the structural rod in the lattice joint housing, a surface of the inner portion of the keyed feature comprises an embedded EPM and a current path for activating the embedded EPM, the embedded EPM is configured to align and clamp with the EPM retaining device and prevent the structural rod from rotating around an axial direction.

2. The system of claim 1, wherein the keyed features are composed of a two-piece locking system where each part forms a portion of the lock, allowing each part to be connected with little or no force.

3. The system of claim 1, wherein each of the plurality of structural joints are mechanically coupled to the lattice joint housing by a plurality of mechanical fasteners, adhesive, or bonding.

4. The system of claim 1, wherein each of the plurality of structural joints incorporate a keyed type retaining feature, allowing the mating lattice member to be rotated after being inserted in the side entry slot.

5. The system of claim 4, wherein the keyed type retaining feature is configured to hold the mating lattice member axially in place and react axial loads onto the lattice joint housing.

6. The system of claim 1, wherein each of the plurality of structural joints comprise a plurality of clearance holes, each of the plurality of clearance holes are configured to enable a plurality of mechanical fasteners to mechanically couple to a corresponding structural joint.

7. The system of claim 1, wherein each of the plurality of structural joints are composed of a base plate and a lock plate, forming the side entry slot.

8. The system of claim 1, further comprising:
a plurality of rods configured to mate with the plurality of structural joints by way of the side entry slot.

9. The system of claim 8, wherein each of the plurality of rods are composed of a first insert on one end and a second insert on the opposite end.

10. The system of claim 9, wherein the first insert or second insert mate with a retaining feature of one of the plurality of structural joints to axially lock the rod with the one of the plurality of structural joints.

11. The system of claim 9, wherein the first insert or second insert comprise the embedded EPM, providing the current path for activating and deactivating the embedded EPM.

12. The system of claim 11, further comprising a wiring harness connecting the embedded EPM with one or more electrical contacts, wherein
the one or more electrical contacts provide a current path from an external source, such that a current is routed from the one or more electrical contacts to a wiring harness and embedded EPM to activate or deactivate the embedded EPM.

13. The system of claim 11, wherein each of the plurality of structural joints have an embedded ferromagnetic plate, providing a magnetic flux path for the embedded EPM, and
the flux path is configured to create a clamping force between the embedded ferromagnetic plate and the embedded EPM, preventing rotation of the rod while the embedded EPM is activated.

14. A system, comprising:
a lattice joint housing; and
a plurality of structural joints, each of the plurality of structural joints have a side entry slot for insertion of keyed features on a mating lattice member, the keyed features being part of a structural rod, wherein
each of the plurality of structural joints comprising a first retaining and a second retaining feature, and are configured to rotate the mating lattice member, semi-permanently holding the mating lattice member in place with an electro-permanent magnetic (EPM) retaining device, the EPM retaining device being part of the second retaining feature, wherein
the keyed feature has an inner portion and an outer portion, the inner portion being smaller in width than the outer portion, the inner portion being closer in proximity to the structural rod than the outer portion,
the keyed feature comprising two opposing parallel sides extending along a longitudinal axis of the mating lattice member, the two opposing parallel sides are formed on both the inner and outer portions, wherein the two opposing parallel sides are inserted within the side entry slot to abut interior surfaces of one of the plurality of structural joints and prevent rotation,
a surface of the outer portion of the keyed feature and a surface of the first retaining feature overlap, retaining the structural rod in the lattice joint housing,
a surface of the inner portion of the keyed feature comprises an embedded EPM and a current path for activating the embedded EPM, the embedded EPM is configured to align and clamp with the EPM retaining device and prevent the structural rod from rotating around an axial direction, and
the keyed feature comprising one or more electrical contacts provide a current path from an external source, such that a current is routed from the one or more electrical contacts to a wiring harness and embedded EPM to activate or deactivate the embedded EPM.

15. The system of claim 14, wherein the keyed features are composed of a two-piece locking system where each part forms a portion of the lock, allowing each part to be connected with little or no force.

16. The system of claim 14, wherein each of the plurality of structural joints are mechanically coupled to the lattice joint housing by a plurality of mechanical fasteners, adhesive, or bonding.

17. The system of claim 14, wherein each of the plurality of structural joints incorporate a keyed type retaining feature, allowing the mating lattice member to be rotated after being inserted in the side entry slot.

18. The system of claim 17, wherein the keyed type retaining feature is configured to hold the mating lattice member axially in place and react axial loads onto the lattice joint housing.

19. The system of claim 14, wherein each of the plurality of structural joints comprise a plurality of clearance holes, each of the plurality of holes are configured to enable a plurality of mechanical fasteners to mechanically couple to a corresponding structural joint.

20. The system of claim 14, wherein each of the plurality of structural joints are composed of a base plate and a lock plate, forming the side entry slot.

21. The system of claim 14, further comprising:
a plurality of rods configured to mate with the plurality of structural joints by way of the side entry slot.

22. The system of claim 21, wherein each of the plurality of rods are composed of a first insert on one end and a second insert on the opposite end.

23. The system of claim 22, wherein the first insert or the second insert mate with a retaining feature of one of the plurality of structural joints to axially lock the rod with one of the plurality of structural joints.

24. The system of claim 22, wherein the first insert or the second insert comprise the embedded EPM, providing the current path for activating and deactivating the embedded EPM.

25. The system of claim 24, wherein each of the plurality of structural joints have an embedded ferromagnetic plate, providing a magnetic flux path for the embedded EPM, and
the flux path is configured to create a clamping force between the embedded ferromagnetic plate and the embedded EPM, preventing rotation of the rod while the embedded EPM is activated.

26. A system, comprising:
a lattice joint housing; and
a plurality of structural joints, each of the plurality of structural joints have a side entry slot for insertion of keyed features on a mating lattice member, the keyed features being part of a structural rod, wherein
the side entry slot is an axially extending slot parallel to a longitudinal axis of one of the plurality of structural joints, such that one of the keyed features is inserted radially into the side entry slot, the side entry slot is located on a circumferentially extending outermost surface such that the side entry slot cuts through the circumferentially extending outermost surface,
each of the plurality of structural joints comprising a first retaining feature and a second retaining feature, and are configured to rotate the mating lattice member, semi-permanently holding the mating lattice member in place with an electro-permanent magnetic (EPM) retaining device, the EPM retaining device being part of the second retaining feature,
the keyed feature has an inner portion and an outer portion, the inner portion being smaller in width than the outer portion, the inner portion being closer in proximity to the structural rod than the outer portion,
a surface of the outer portion of the keyed feature and a surface of the first retaining feature overlap, retaining the structural rod in the lattice joint housing,
a surface of the inner portion of the keyed feature comprise an embedded EPM and a current path for activating the embedded EPM, the embedded EPM is configured to align and clamp with the EPM retaining device and prevent the structural rod from rotating around an axial direction.

* * * * *